J. & W. A. McNEIL.
SUGAR CANE AND LIKE MILL.
APPLICATION FILED FEB. 5, 1913.

1,071,646.

Patented Aug. 26, 1913.
2 SHEETS—SHEET 2.

WITNESSES
L. H. Grote
M. G. Keir

INVENTORS
John McNeil
William Arnott McNeil
By Henson & Henson - Attys

UNITED STATES PATENT OFFICE.

JOHN McNEIL AND WILLIAM ARNOTT McNEIL, OF GOVAN, GLASGOW, SCOTLAND.

SUGAR-CANE AND LIKE MILL.

1,071,646.  Specification of Letters Patent.  Patented Aug. 26, 1913.

Application filed February 5, 1913. Serial No. 746,334.

*To all whom it may concern:*

Be it known that we, JOHN McNEIL and WILLIAM ARNOTT McNEIL, subjects of the King of Great Britain and Ireland, and residents of Govan, in the city and county of Glasgow, Scotland, have invented certain new and useful Improvements in Connection With Sugar-Cane and Like Mills, of which the following is the specification.

Hitherto in sugar-cane and like mills the roll bearing caps have been secured upon the housings by lengthy bolts passing through the housings to opposed caps, or securely anchored in the housings and foundation. Obviously, such a construction is expensive. It is also cumbrous in assembling or dismantling.

The invention has for its object to provide a manner of securing the caps which is at least equally effective and by which these disabilities are avoided.

According to the invention the ends of the cap and the adjacent sides of the usual projecting parts of the housing in which the roll-bearing aperture is formed are so counterpartly formed that they engage one another, thus resisting bursting pressure. Grooves are formed across or through adjacent parts of the cap and housings to receive keys, bolts or the like which secure the caps in position and at the same time act to resist outward thrust. With the improved construction thus provided the caps, while effectively resisting both outward thrust and bursting pressure, are much more readily placed in position or removed than is possible with the known constructions in which are used lengthy securing bolts passing through the housings. The caps may be formed to receive any of the usual types of hydraulic pressure regulating gear, or alternatively may be provided with distance pieces between them and the outer halves of the bearing bushes. It is obviously necessary in carrying out this manner of avoiding the use of securing bolts that a material other than cast iron (for instance cast steel) be used for housings and caps in order that adequate strength may be attained without undue size and weight.

The invention may be carried out in numerous ways without departing from the essential features thereof.

Figure 1:
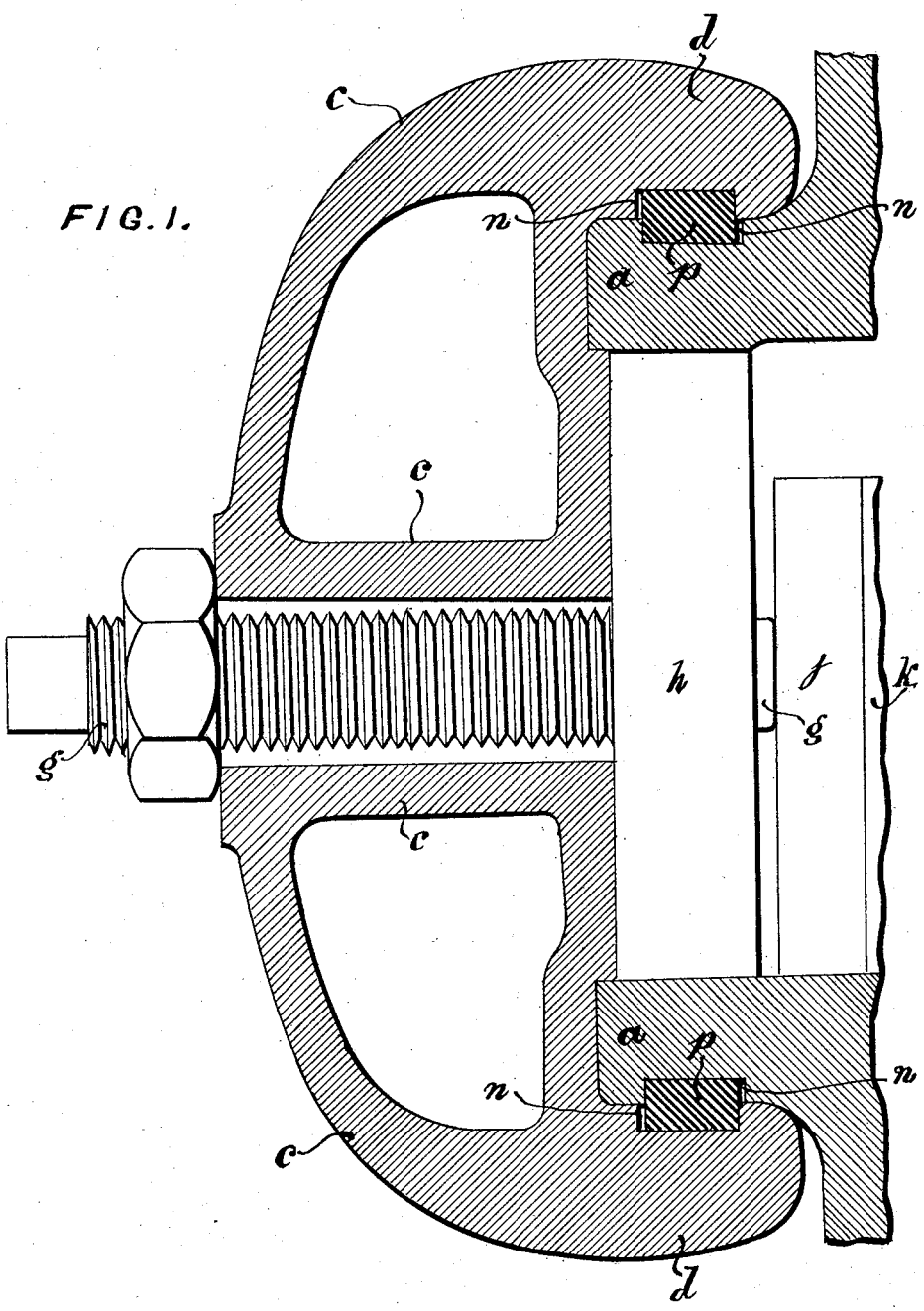
Figure 2:
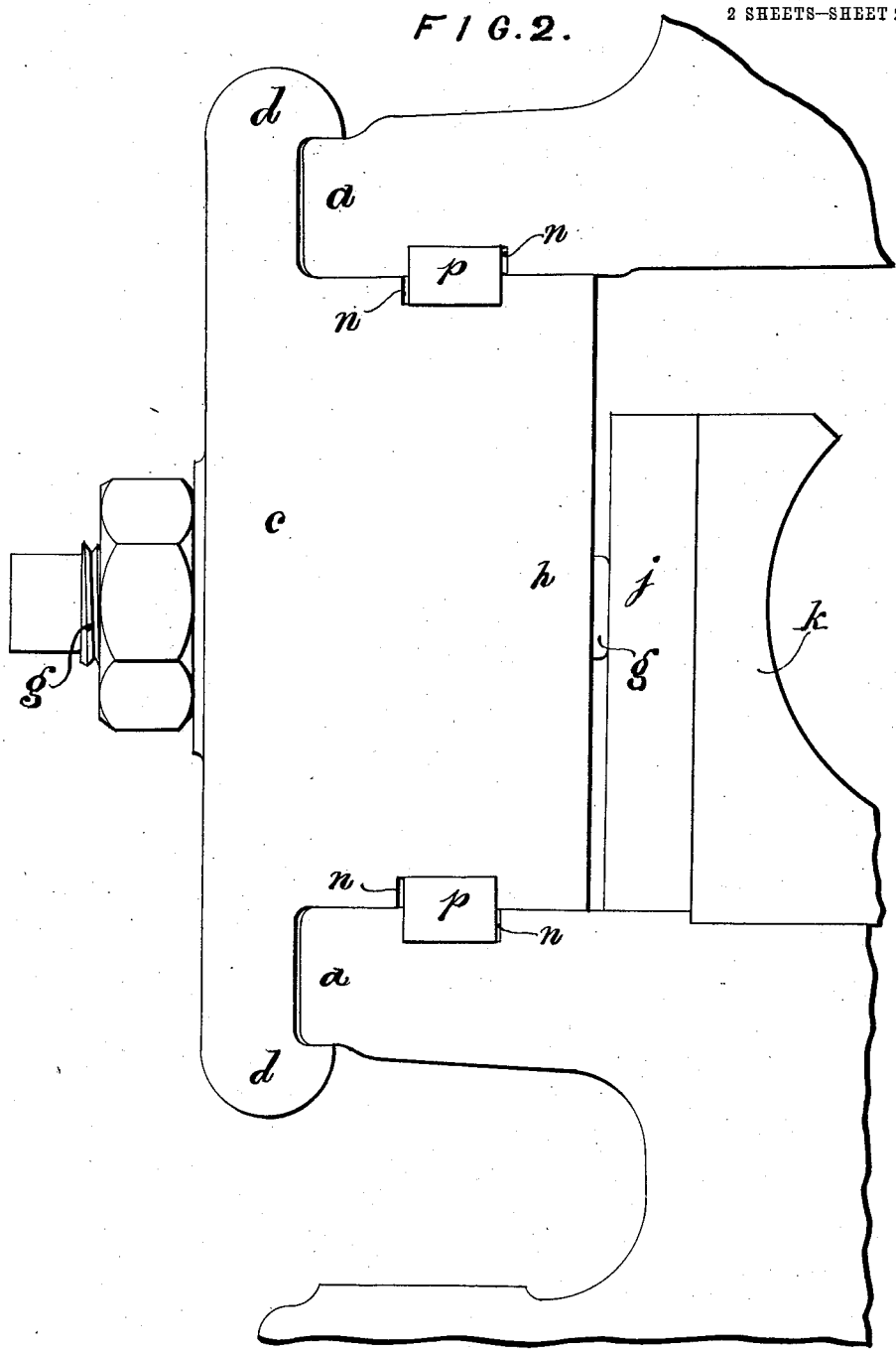

Figure 1, Sheet 1, and Fig. 2, Sheet 2, are vertical sections showing two examples of the invention as applied to the bearing aperture of one of the side rolls of a sugar-cane mill.

In carrying out the invention according to the illustrative example shown in Fig. 1, the cap $c$ extends laterally beyond the usual projecting parts $a$ of the housing in which the roll-bearing aperture is formed, and has on its ends inwardly projecting lugs $d$ embracing the parts $a$ thus reinforcing them against bursting pressure. The adjacent faces of the lugs $d$ and of the projecting parts $a$ of the housing have formed across them grooves $n$. When the cap $c$ is placed on the housing, keys $p$ are driven into the conjoint grooves, the keys not only securing the cap in position, but enabling it to effectively resist outward thrust. In this example the pressure regulating gear is of usual screw spindle type $g$. The inner end of the spindle carries a distance piece $h$ and bears on a washer $j$ between the distance piece and the bearing bush $k$ of the roll (not shown).

The example shown in Fig. 2 differs only from that hereinbefore described in that the central distance piece $h$ is in a piece with the cap $c$, and the conjoint grooves $n$, to receive the keys $p$, are formed across the adjacent faces of the distance piece and the aperture in the housing into which the distance piece $h$ projects.

What we claim is:—

1. In a mill of the character described, roll housings apertured for roll bearings, projections on the parts of the housings in which the roll-bearing aperture is formed, a roll housing cap and projections thereon counterpart to and engaging the housing projections, said cap being apertured to permit the entry of pressure regulating means into the roll bearing aperture beneath the cap, grooves in adjacent parts of the housing and cap, and means engaged in said grooves for holding the cap in position on the housing.

2. In a mill of the character described, roll housings apertured for roll bearings, projections on the parts of the housings in which the roll-bearing aperture is formed, a roll housing cap extending laterally beyond the projecting parts of the housing, inwardly projecting lugs on the cap embracing these projecting parts of the housing, said cap being apertured to permit the entry of pressure regulating means into the roll bearing aperture beneath the cap and engaging means between the adjacent portions of the inwardly projecting lugs on the cap and the projecting parts of the housing for securing said cap upon the housing.

3. In a mill of the character described, roll housings apertured for roll bearings, projections on the parts of the housings in which the roll-bearing aperture is formed, a roll housing cap extending laterally beyond the projecting parts of the housing, inwardly projecting lugs on the cap embracing these projecting parts of the housing, said cap being apertured to permit the entry of pressure regulating means into the roll bearing aperture beneath the cap, registering grooves in the adjacent faces of the projecting parts of the housing and the inwardly projecting lugs on the cap and locking keys in said grooves for securing said cap in position on the housing.

4. In a mill of the character described, roll housings apertured for roll bearings, projections on the parts of the housings in which the roll-bearing aperture is formed, a roll housing cap and projections thereon counterpart to and engaging the housing projections, a pressure-regulating distance piece on the inner side of and in one with the cap, registering grooves in the adjacent faces of the projecting parts of the housing and the pressure-regulating distance piece on the cap and keys engaged in said grooves to hold the cap in position on the housing.

In testimony whereof we have signed our names to this specification, in the presence of two subscribing witnesses.

JOHN McNEIL.
WILLIAM ARNOTT McNEIL.

Witnesses:
DAVID FERGUSON,
JAMES EAGLESOM.

Copies of this patent may be obtained for five cents each, by addressing the "Commissioner of Patents, Washington, D. C."